United States Patent
Akl et al.

(10) Patent No.: US 12,069,696 B2
(45) Date of Patent: Aug. 20, 2024

(54) PRIORITY-BASED RESOURCE PLANNING IN INTEGRATED ACCESS AND BACKHAUL RADIO ACCESS NETWORK SHARING

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/447,523

(22) Filed: Sep. 13, 2021

(65) Prior Publication Data

US 2022/0086828 A1 Mar. 17, 2022

Related U.S. Application Data

(60) Provisional application No. 62/706,858, filed on Sep. 14, 2020.

(51) Int. Cl.
*H04W 72/04* (2023.01)
*H04W 72/1263* (2023.01)
*H04W 72/27* (2023.01)
*H04W 72/566* (2023.01)
*H04W 76/36* (2018.01)

(52) U.S. Cl.
CPC ....... *H04W 72/27* (2023.01); *H04W 72/1263* (2013.01); *H04W 72/569* (2023.01); *H04W 76/36* (2018.02)

(58) Field of Classification Search
None
See application file for complete search history.

(56) References Cited

U.S. PATENT DOCUMENTS

2022/0263797 A1* 8/2022 Liu ..................... H04L 61/5007

FOREIGN PATENT DOCUMENTS

WO WO-2020169185 A1 * 8/2020 ........ H04W 72/0446

OTHER PUBLICATIONS

International Search Report and Written Opinion—PCT/US2021/071452—ISA/EPO—Jan. 5, 2022.
(Continued)

*Primary Examiner* — Kouroush Mohebbi
(74) *Attorney, Agent, or Firm* — Arun Swain

(57) ABSTRACT

Various aspects of the present disclosure generally relate to wireless communication. In some aspects, a network node may transmit, to a first integrated access and backhaul (IAB) donor central unit (CU), an indication of a first priority level associated with a first communication resource served by a distributed unit (DU) of the network node and a second priority level associated with a second communication resource served by the DU, wherein the first priority level is higher than the second priority level. The network node may receive, from the first IAB donor CU, a first resource configuration for the first communication resource based at least in part on the indication of the first priority level. Numerous other aspects are described.

30 Claims, 11 Drawing Sheets

(56) References Cited

OTHER PUBLICATIONS

ZTE, et al., "(TP for NR-IAN BL CR for TS 38.473): BH RLC Channel Configuration", 3GPP Draft, 3GPP TSG RAN WG3 Meeting #106, R3-196681, 3rd Generation Partnership Project (3GPP), Mobile Competence Centre, 650, Route Des Lucioles, F-06921 Sophia-Antipolis Cedex, France, vol. Ran WG3, No. Reno, USA, Nov. 18, 2019-Nov. 22, 2019 Nov. 9, 2019 (Nov. 9, 2019), XP051823885, 16 Pages Retrieved from the Internet: URL: https://ftp.3gpp.org/tsg_ran/WG3_lu/TSGR3_106/Docs/R3-196681.zip R3-196681 (TP for NR_IAN BL CR for TS 38.473) BH RLC Channel Configuration in IAB Network.doc [retrieved on Nov. 9, 2019] p. 2.

\* cited by examiner

PRIORITY-BASED RESOURCE PLANNING IN INTEGRATED ACCESS AND BACKHAUL RADIO ACCESS NETWORK SHARING

CROSS-REFERENCE TO RELATED APPLICATION

This patent application claims priority to U.S. Provisional Patent Application No. 62/706,858, filed on Sep. 14, 2020, entitled "PRIORITY-BASED RESOURCE PLANNING IN INTEGRATED ACCESS AND BACKHAUL RADIO ACCESS NETWORK SHARING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for priority-based resource planning in integrated access and backhaul radio access network sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LIE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a network node includes transmitting, to a first integrated access and backhaul (IAB) donor central unit (CU), an indication of a first priority level associated with a first communication resource served by a distributed unit (DU) of the network node and a second priority level associated with a second communication resource served by the DU, wherein the first priority level is higher than the second priority level; and receiving, from the first IAB donor CU, a first resource configuration for the first communication resource based at least in part on the indication of the first priority level.

In some aspects, a network node for wireless communication includes a memory; and one or more processors coupled to the memory, the memory and the one or more processors configured to: transmit, to a first IAB donor CU, an indication of a first priority level associated with a first communication resource served by a DU of the network node and a second priority level associated with a second communication resource served by the DU, wherein the first priority level is higher than the second priority level; and receive, from the first IAB donor CU, a first resource configuration for the first communication resource based at least in part on the indication of the first priority level.

In some aspects, a non-transitory computer-readable medium storing a set of instructions for wireless communication includes one or more instructions that, when executed by one or more processors of a network node, cause the network node to: transmit, to a first IAB donor CU, an indication of a first priority level associated with a first communication resource served by a DU of the network node and a second priority level associated with a second communication resource served by the DU, wherein the first priority level is higher than the second priority level; and receive, from the first IAB donor CU, a first resource configuration for the first communication resource based at least in part on the indication of the first priority level.

In some aspects, an apparatus for wireless communication includes means for transmitting, to a first IAB donor CU, an indication of a first priority level associated with a first communication resource served by a distributed unit (DU) of the apparatus and a second priority level associated with a second communication resource served by the DU, wherein the first priority level is higher than the second priority level; and means for receiving, from the first IAB donor CU, a first resource configuration for the first communication resource based at least in part on the indication of the first priority level.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
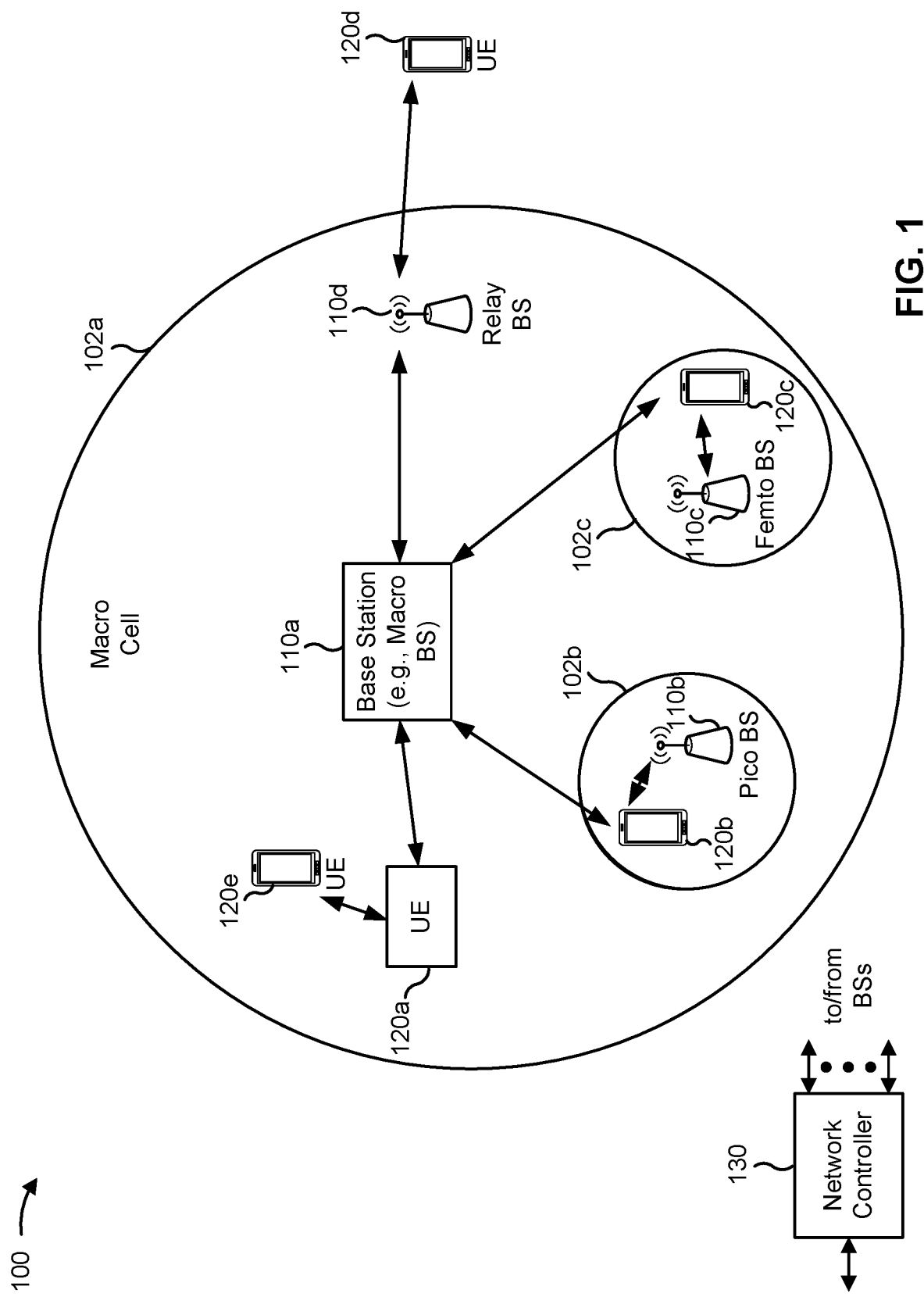
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
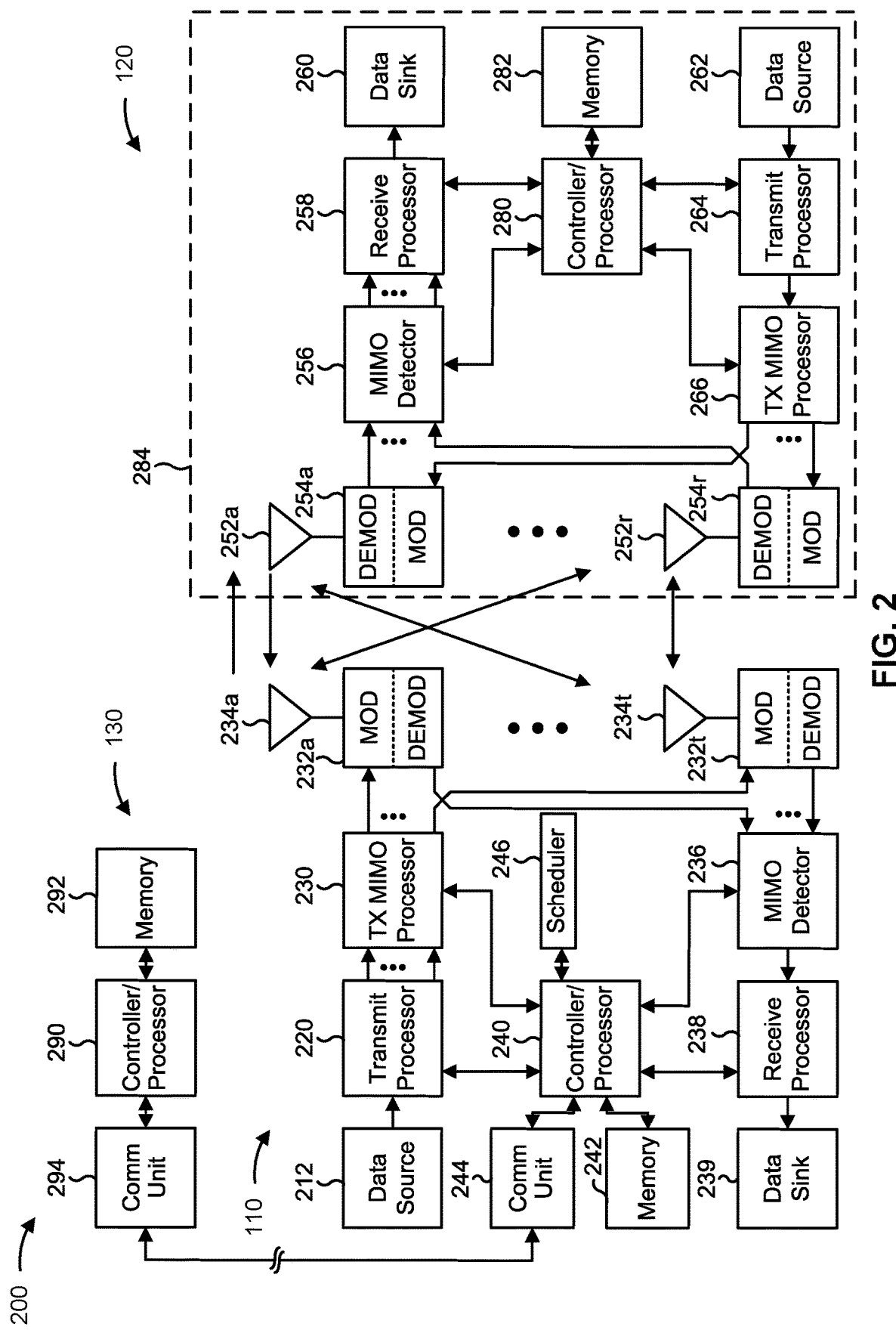
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 8-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 8-11).

Controller/processor 240 of base station 110, controller/processor 280 of UE 120, and/or any other component(s) of FIG. 2 may perform one or more techniques associated with priority-based resource planning in integrated access and backhaul (IAB) radio access network (RAN) sharing, as described in more detail elsewhere herein. For example, controller/processor 240 of base station 110, controller/processor 280 of UE 120, and/or any other component(s) of FIG. 2 may perform or direct operations of, for example, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some aspects, executing instructions may include running the instructions, converting the instructions, compiling the instructions, and/or interpreting the instructions, among other examples.

In some aspects, a network node (e.g., a base station 110, an IAB node, and/or the like) may include means for transmitting, to a first IAB donor central unit (CU), an indication of a first priority level associated with a first communication resource served by a distributed unit (DU) of the network node and a second priority level associated with a second communication resource served by the DU, wherein the first priority level is higher than the second priority level, means for receiving, from the first IAB donor CU, a first resource configuration for the first communication resource based at least in part on the indication of the first priority level, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
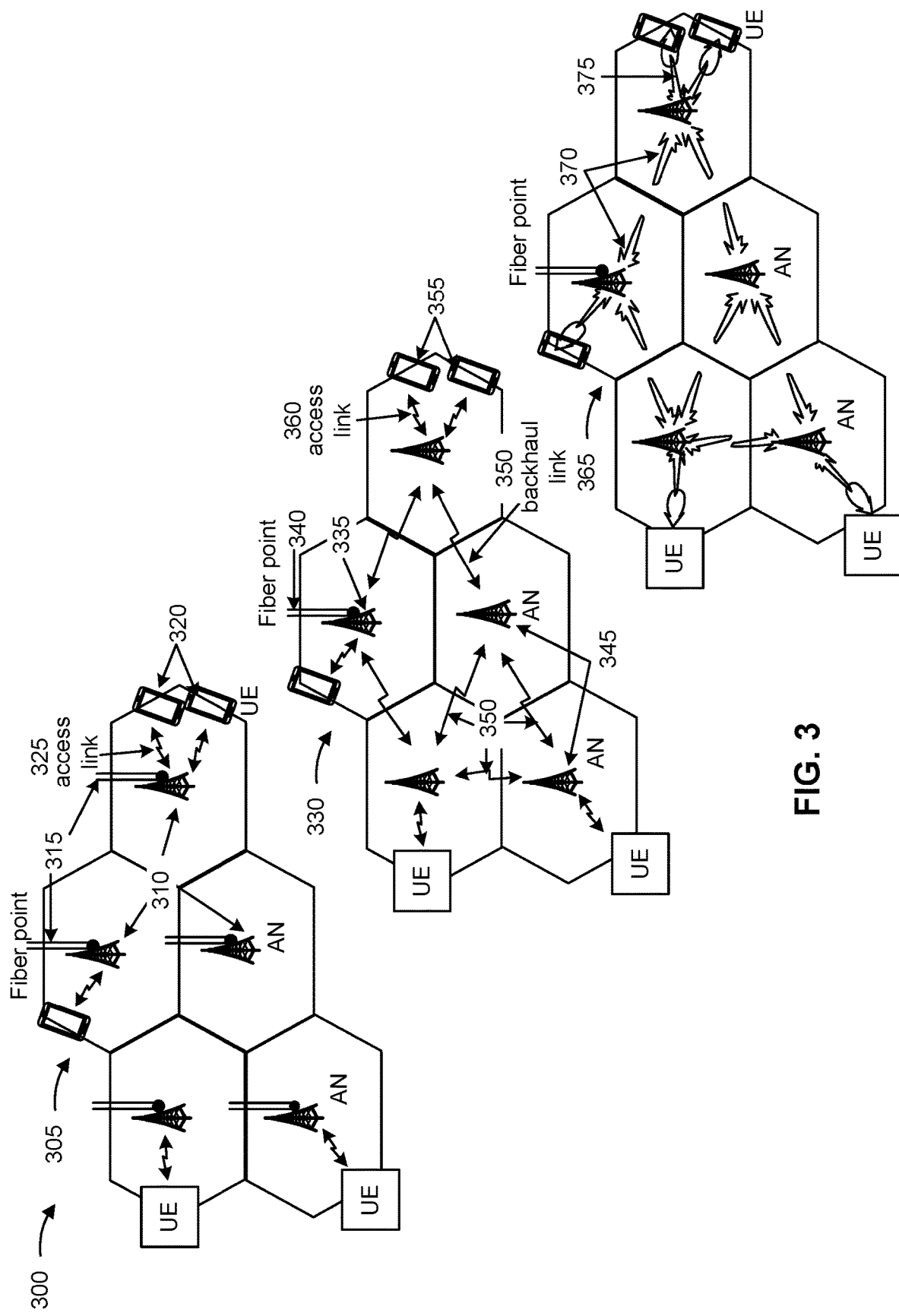
FIG. 3 is a diagram illustrating examples of radio access networks, in accordance with the disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
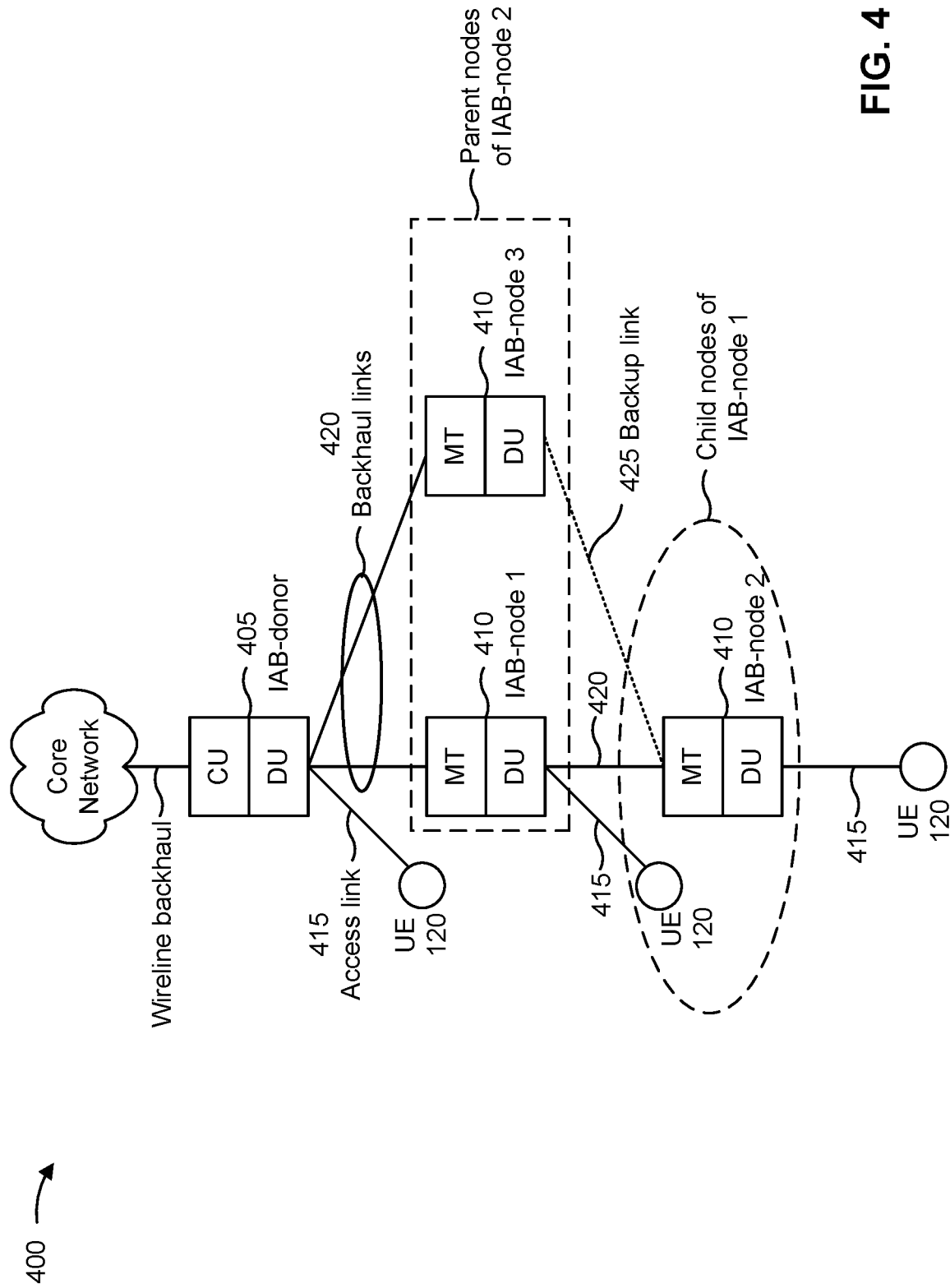
FIG. 4 is a diagram illustrating an example of an integrated access and backhaul (IAB) network architecture, in accordance with the disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface (e.g., a user plane interface between the NG-RAN node and the user plane function) of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message, and/or the like). An IAB node may function as a Layer 2 relay for traffic transported via an IAB network configured or managed by a CU.).

A CU (whether associated with an IAB donor or a gNB) may perform RRC layer functions and packet data convergence protocol (PDCP) functions. A DU may act as a scheduling node that schedules child nodes of a network node associated with the DU. For example, the DU may perform radio link control (RLC), medium access control (MAC), and physical (PHY) layer functions.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
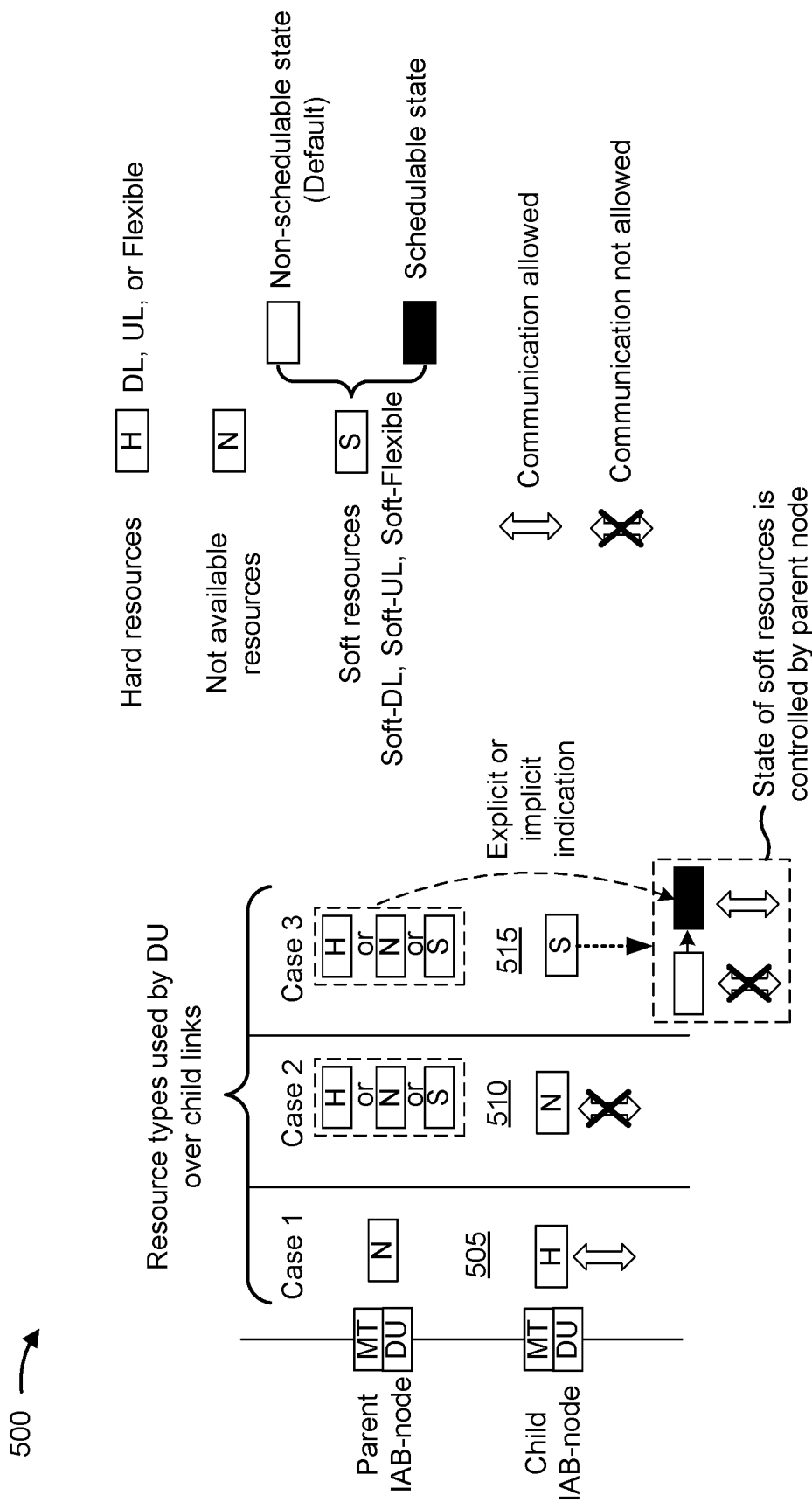
FIG. 5 is a diagram illustrating an example of resource types in an IAB network, in accordance with the disclosure.

FIG. 5 is a diagram illustrating an example 500 of resource types in an IAB network, in accordance with the disclosure.

In an IAB network, time domain resources (sometimes referred to as time resources) may be configured as downlink-only, uplink-only, flexible, or not available (e.g., NA, unavailable). For example, time domain resources may be configured via a DU cell resource configuration, such as a gNB-DU cell resource configuration, as described in more detail in connection with FIG. 6. When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs) (both cell-defining SSBs (CD-SSBs) and non-CD-SSBs), channel state information reference signals (CSI-RS), physical downlink control channel (PDCCH) communications, physical downlink shared channel (PDSCH) communications, and/or the like. Examples of uplink communications include physical random access channel (PRACH) communications, physical uplink control channel (PUCCH) communications, physical uplink shared channel (PUSCH) communications, sounding reference signals (SRS), and/or the like.

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and the time resource may be configured as not available for a parent node of the child node. In this case, the parent node cannot communicate using that time resource, but the child node can schedule communications in that time resource and/or communicate using that time resource. This configuration may reduce interference between the parent node and the child node, may reduce scheduling conflicts between the parent node and the child node, and/or the like.

As another example, and as shown by reference number 510, a time resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples are possible and may differ from what was described with regard to FIG. 5.

Figure 6:
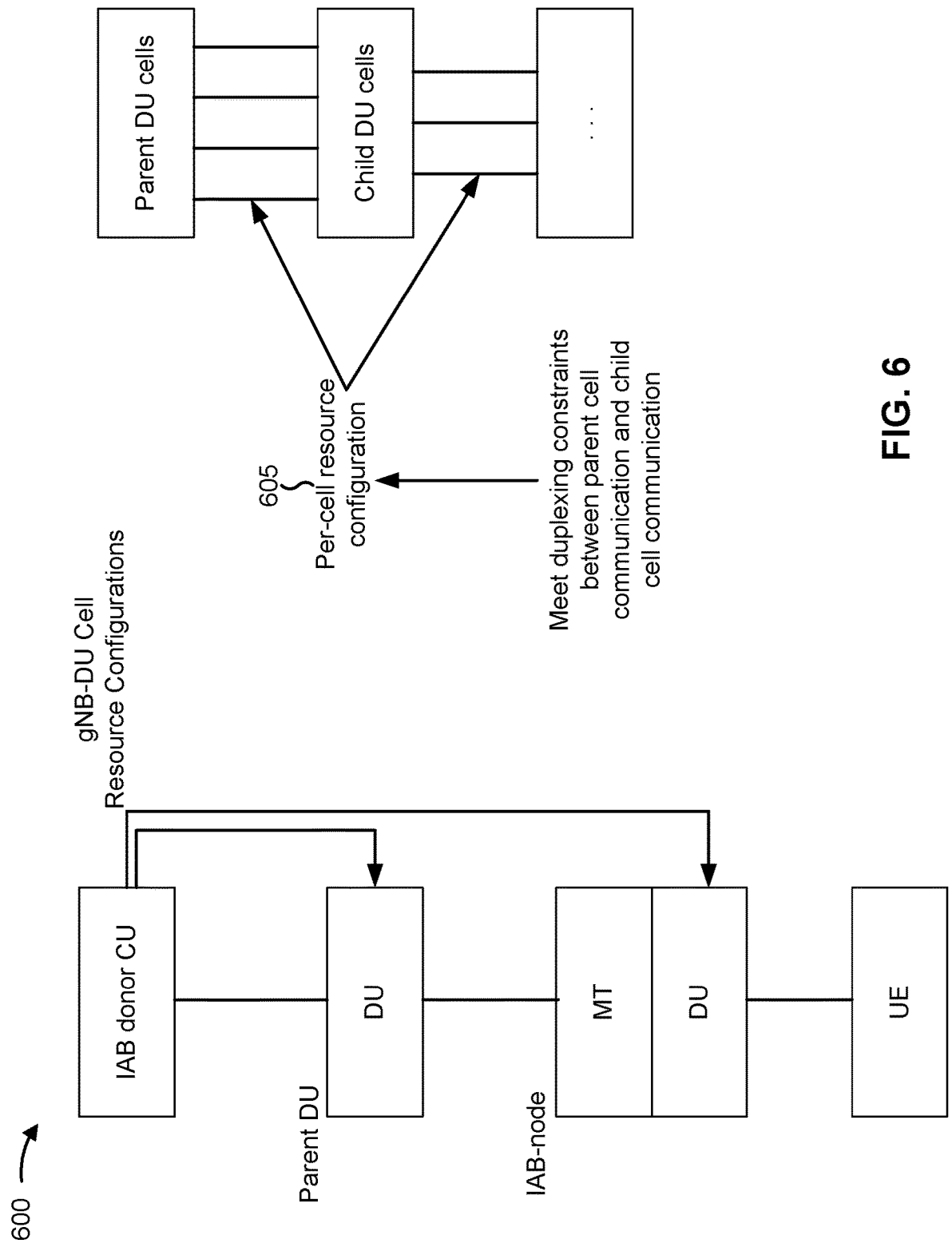
FIG. 6 is a diagram illustrating an example of DU cell resource configuration for IAB, in accordance with the present disclosure.

FIG. 6 is a diagram illustrating an example 600 of DU cell resource configuration for IAB, in accordance with the present disclosure. Example 600 includes an IAB-donor CU. The IAB-donor CU may be associated with a gNB. The IAB-donor CU may handle resource configuration for the parent DU and the IAB node. Thus, the IAB-donor CU may accommodate half-duplex constraints of the parent DU, the IAB node, and/or other nodes of the IAB network.

The IAB-donor CU may provide a resource configuration via a cell resource configuration, shown as "gNB-DU cell resource configuration." In some aspects, as shown by reference number 605, the cell resource configuration may be specific to a cell. For example, the IAB-donor CU may provide a respective cell resource configuration for each cell served by a DU. The cell resource configuration may indicate at least part of the information described with regard to FIG. 5.

The term "cell" may refer to a logical communication entity used for communication with a base station (e.g., over a carrier), and may be associated with an identifier for distinguishing neighboring cells operating via the same or a different carrier. In some examples, the cells may support different service and/or device types (e.g., machine-type communication (MTC), narrowband Internet-of-Things (NB-IoT), enhanced mobile broadband (eMBB), ultra-reliable low-latency (URLLC) communications, and others). In some cases, the term "cell" may refer to a portion of a geographic coverage area (e.g., a sector) over which the logical entity operates. A cell may be referred to as "served by" a DU if the DU handles scheduling for communications via the cell.

A cell may have a cell global identifier (CGI), such as an NR CGI (NCGI). The NCGI uniquely identifies a cell. The NCGI includes a public land mobile network (PLMN) identifier and an NR cell identifier. The PLMN identifier (which may include 24 bits) may include an MCC (e.g., 12 bits) and an MNC (e.g., 12 bits). The NCI (e.g., 36 bits in 5G) may include a gNB identifier (e.g., a leftmost 22 to 32 bits) and a local cell identifier (e.g., the remaining bits of the NCI). The gNB may be unique within a gNB, and may be common for all cells (e.g., all IAB-donor DUs and all IAB-node DUs) served by the gNB with one IAB-donor CU. Equivalently, the PLMN and gNB ID may globally identify a gNB.

As indicated above, FIG. 6 is provided as an example. Other examples are possible and may differ from what was described with regard to FIG. 6.

Figure 7:
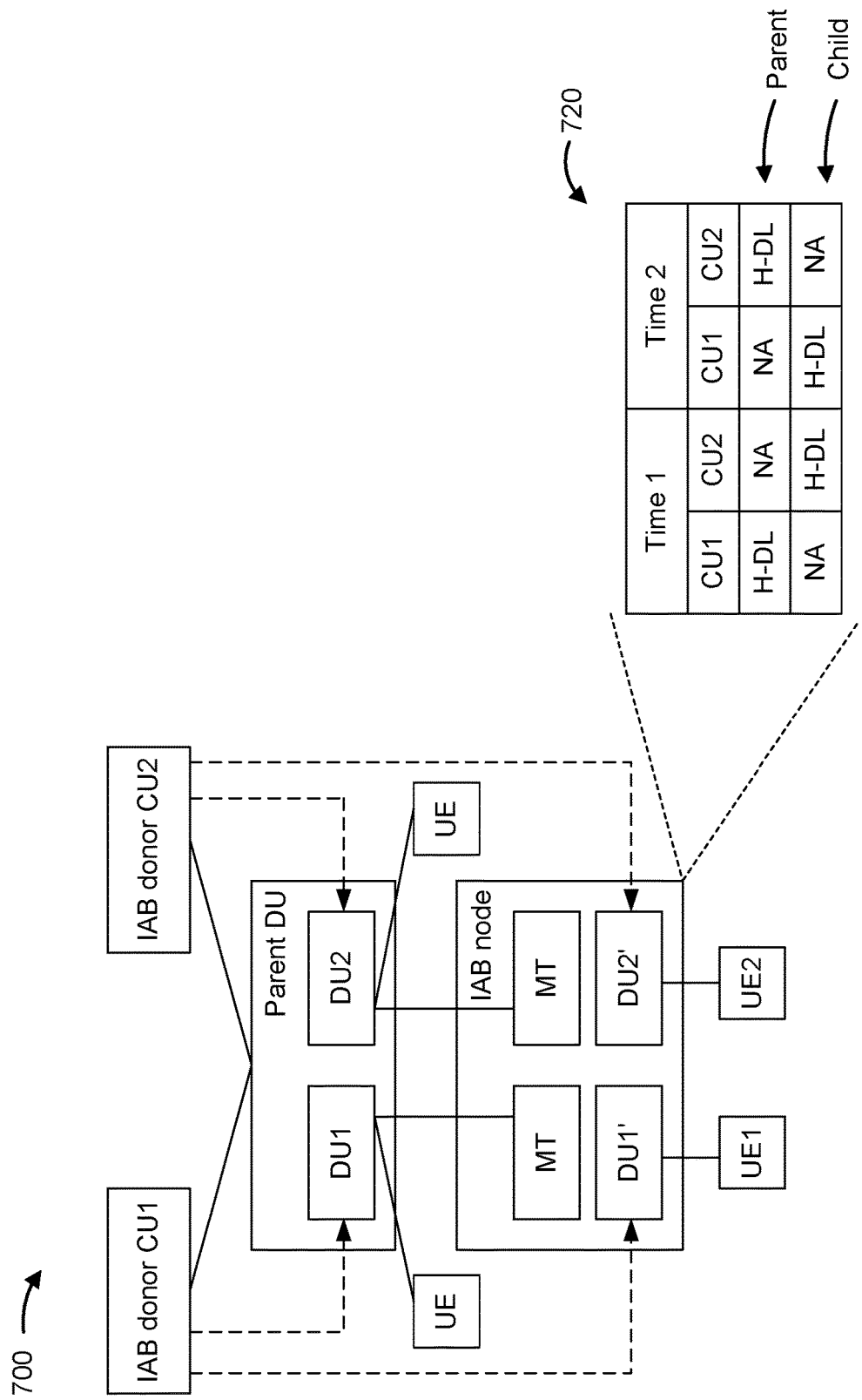
FIGS. 7 and 8 are diagrams illustrating examples of radio access network (RAN) sharing for IAB, in accordance with the present disclosure.

FIG. 7 is a diagram illustrating an example 700 of radio access network (RAN) sharing for IAB, in accordance with the present disclosure.

As shown in FIG. 7, in a RAN sharing scenario, there may be two donor CUs: an IAB donor CU1 (referred to as a CU1) and an IAB donor CU2 (referred to as a CU2). CU1 and CU2 may be associated with enhanced gNBs that support IAB functionality. In some cases, as shown in FIG. 7, CU1 and CU2 may manage a shared communication resource associated with an IAB node. The communication resource may be for serving one or more child nodes (e.g., UE1) associated with a first DU (referred to as DU1) of a parent DU, one or more child nodes (e.g., UE2) associated with a second DU (referred to as DU2) of a parent DU, and/or the like.

As shown in FIG. 7, the IAB node may receive resource configurations for serving communication resources from CU1 and CU2. In some cases, a parent node and a child node may apply a configuration from a CU for non-orthogonal resources to handle multiplexing constraints. In some cases, however, the parent node may apply the configuration received from one CU and the child node may apply the configuration received from the other CU. In this case, application of the two configurations may result in multiplexing constraints not being satisfied.

For example, as shown by reference number 720, a first resource configuration for a resource at a first time (shown as Time 1) and at a second time (shown as Time 2) may have different availability than a second resource configuration for the resource at Time 1 and Time 2. As shown, for example, a first resource configuration (indicated by CU1) may be received from CU1 and a second resource configuration (indicated by CU2) may be received from CU2. The top row of configuration information may be associated with the parent node (e.g., the Parent DU) and the bottom row may be associated with a child node (e.g., the IAB node).

At Time 1, if the parent node and the child node both apply the first resource configuration (CU1), the resource is shown as being hard downlink (shown as "H-DL") for the parent node, which means the resource is available for downlink. At Time 1, under the first resource configuration, the resource is indicated as not available (shown as "NA") to the child node. Thus, if both the child node and the parent node apply the first resource configuration, there is no conflict. However, if the parent node applies the first resource configuration and the child node applies the second resource configuration (indicated by CU2), the resource is indicated as hard downlink for both the parent node and the child node. If both the child node and the parent node use the resource at Time 1, the communications may interfere with one another. Such interference may diminish throughput, cause radio link failure, and necessitate aggressive interference mitigation, thus consuming network resources and negatively impacting network performance.

Additionally, the child node may apply the first resource configuration at Time 2, and the parent node may apply the second resource configuration at Time 2. In this case, the resource is indicated as not available for both the parent node and the child node at Time 2. Thus, the resource may go unused, introducing inefficiencies in resource allocation, which may negatively impact network performance.

Some techniques and apparatuses described herein provide signaling that enables an IAB donor CU to consider priority level as an additional dimension in resource planning By selecting resource configurations based at least in part on priority levels associated with traffic, some techniques and apparatuses described herein may facilitate providing resource configurations that may reduce interference, improve efficiency of communication, and improve utilization of network resources, thereby positively impacting network performance.

As indicated above, FIG. 7 is provided as an example. Other examples may differ from what was described with regard to FIG. 7.

Figure 8:
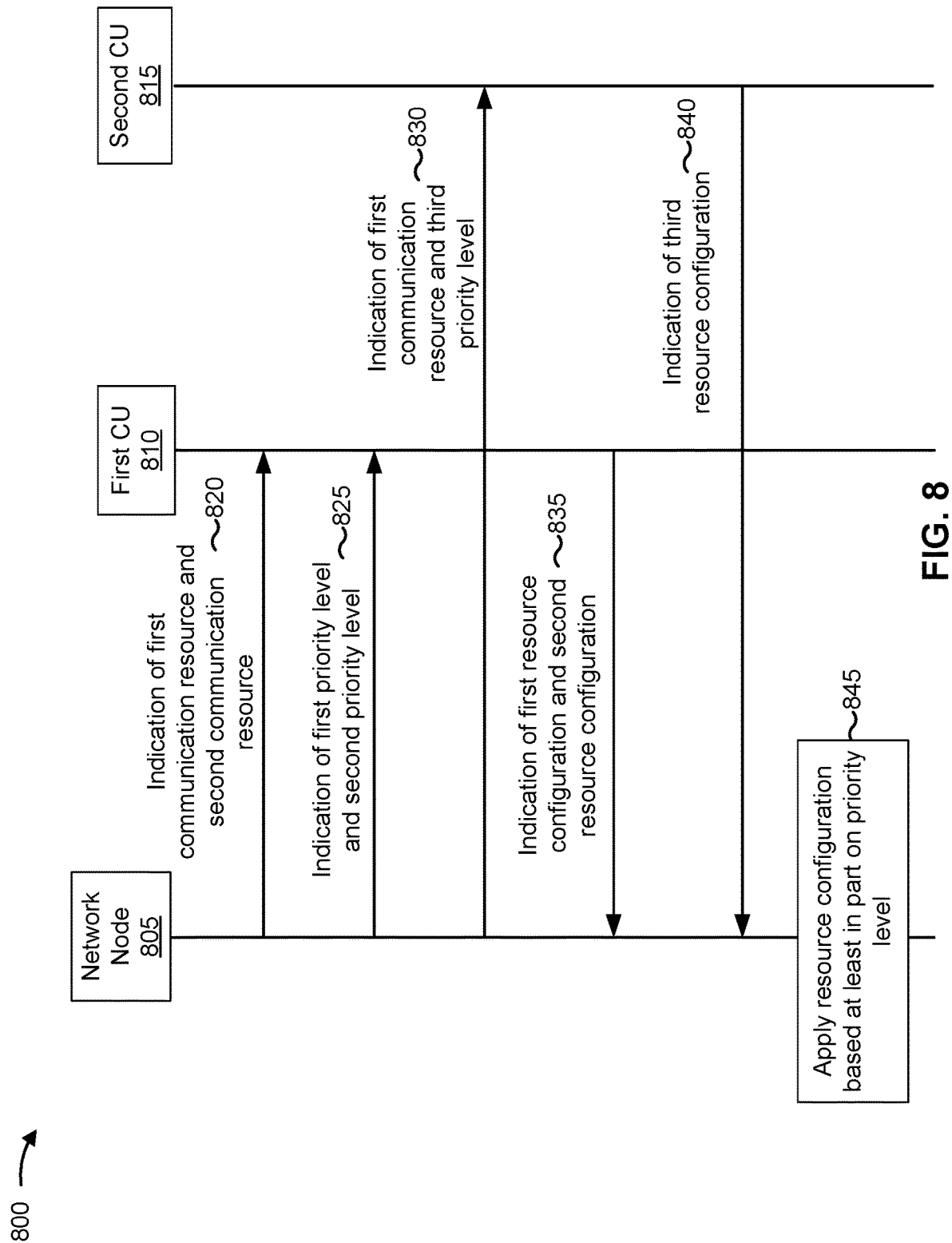

FIG. 8 is a diagram illustrating an example 800 of signaling associated with resource configuration for IAB RAN sharing, in accordance with the present disclosure. As shown, example 800 includes a network node 805, a first CU 810 (e.g., an IAB donor CU), and a second CU 815 (e.g., a second IAB donor CU). The network node 805 may include, for example, an IAB node (e.g., similar to IAB node of FIG. 7). The first CU 810 may include an IAB donor CU (e.g., similar to IAB donor CU1 of FIG. 7). The second CU 815 may include an IAB donor CU (e.g., similar to IAB donor CU2 of FIG. 7). The network node 805 may communicate with the first CU 810 and/or the second CU 815 using a signaling connection. The signaling connection may be associated with at least one of an F1 control protocol or a radio resource control (RRC) controls.

The first CU 810 may be associated with a first network and the second CU 815 may be associated with a second network. The first CU 810 may be associated with resource management for a first IAB topology, and the second CU 815 may be associated with resource management for a second IAB topology that overlaps the first IAB topology. The network node 805 may provide one or more cells based at least in part on one or more resource configurations provided by the first CU 810 and/or the second CU 815.

As shown by reference number 820, the network node 805 may transmit, and the first CU 810 may receive, an indication of a first communication resource and a second communication resource. The first and second communication resources may be served by a DU of the network node 805. The first communication resource and/or the second communication resource may include a cell served by the network node 805, a frequency resource, a time resource, a spatial region, or a combination thereof. As shown by reference number 825, the network node 805 may transmit, and the first CU 810 may receive, an indication of a first priority level associated with the first communication resource and a second priority level associated with the second communication resource. In some aspects, the first priority level may be higher than the second priority level.

As shown by reference number 830, the network node 805 may transmit, and the second CU 815 may receive, an indication of the first communication resource and a third priority level associated with the first communication resource. The third priority level may be different than the first priority level. In some aspects, the network node 805 may transmit, and the first CU 810 may receive, an indication that the network node 805 transmitted, to the second CU 815, the indication of the first communication resource and/or the third priority level associated with the first communication resource.

In some aspects, the network node 805 may select at least one of the first priority level, the second priority level, or the third priority level based at least in part on an associated communication resource, a CU to which the associated resource is reported, a CU to which the at least one of the first priority level, the second priority level, or the third priority level is reported, a network identifier associated with a CU to which the associated resource is reported, a network identifier associated with a CU to which the at least one of the first priority level, the second priority level, or the third priority level is reported, or a combination thereof.

As shown by reference number 835, the first CU 810 may transmit, and the network node 805 may receive, an indication of a first resource configuration for the first communication resource. The first CU 810 also may transmit, as shown, and indication of a second resource configuration for the second communication resource. In some aspects, the first CU 810 may transmit the first resource configuration based at least in part on the indication of the first priority level. The first resource configuration and/or the second resource configuration may indicate an availability of the communication resource (e.g., available, not available, conditionally available), a direction of the resource (e.g., downlink, uplink, flexible), and/or the like.

In some aspects, the network node 805 may determine whether to apply the second resource configuration. For example, the network node 805 may refrain from applying the second resource configuration based at least in part on determining that the first priority level is higher than the second priority level. In this way, resources may be prioritized for higher priority traffic. In some aspects, even though the second priority level may be lower than the first priority level, the network node 805 may apply the second resource configuration based at least in part on determining that a condition is satisfied. For example, as described in connection with FIG. 9, the network node 805 may determine that no traffic exists at a parent DU associated with the communication resource. The network node 805 may apply the second resource configuration to make use of the communication resource that otherwise may be unused. As a result, some aspects may facilitate more efficient use of resources, positively impacting network performance.

As shown by reference number 840, the second CU 815 may transmit, and the network node 805 may receive, an indication of a third resource configuration for the first communication resource. As shown by reference number 845, the network node 805 may apply one of the first resource configuration, the second resource configuration, or the third resource configuration based at least in part on determining which of the first priority level, the second priority level, and the third priority level is highest. In some aspects, an initial priority level associated with a particular type of traffic may be configured on the network node 805. The initial priority level may be configured, for example, by an operations, administration, and maintenance module.

In some aspects, for example, the network node 805 may determine that the first priority level is higher than the third priority level and may apply the first resource configuration based at least in part on determining that the first priority level is higher than the third priority level. The first resource configuration may indicate that the first communication resource is available, and the third resource configuration may indicate that the first communication resource is not available. Thus, the network node 805 may use the first communication resource in this case.

In some aspects, the network node 805 may use the first communication resource for uplink where the first resource configuration indicates that the first communication resource is available for uplink, and the third resource configuration indicates that the first communication resource is available for downlink. In some aspects, the network node 805 may determine that the third priority level is higher than the first priority level and may apply the third resource configuration based at least in part on determining that the third priority level is higher than the first priority level.

The network node 805 may determine that the first priority level is higher than the third priority level and may use the first communication resource to communicate traffic corresponding to the first CU 810 or a network associated with the first CU 810 based at least in part on determining that the first priority level is higher than the third priority level. The network node 805 may, for example, schedule a communication for a child node that is associated with the first CU 810 or that is associated with a network that is associated with the first CU 810.

In some aspects, the network node 805 may determine that the third priority level is higher than the first priority level and may use the first communication resource to communicate traffic corresponding to the second CU 815 or a network associated with the second CU 815 based at least in part on determining that the third priority level is higher than the first priority level. The network node 805 may determine that the first priority level is higher than the third priority level, determine that there is no traffic associated with the first communication resource and corresponding to the first CU 810 or a network associated with the first CU 810, and apply the third resource configuration to the first communication resource based at least in part on determining that there is no traffic associated with the first communication resource.

In some aspects, the network node 805 may determine that the first priority level is higher than the third priority level, that there is no traffic associated with the first communication resource and corresponding to the first CU 810 or a network associated with the first CU 810, and use the first communication resource to communicate traffic corresponding to the second CU 815 or a network associated with the second CU 815 based at least in part on determining that there is no traffic associated with the first communication resource. In some aspects, a first set of traffic associated with the first CU 810 may have a first associated traffic priority level, and a second set of traffic associated with the second CU 815 may have a second associated traffic priority level. The network node 805 may determine that the first priority level is higher than the third priority level, determine that the second traffic priority level is higher than the first traffic priority level, and use the first communication resource to communicate the second set of traffic based at least in part on determining that the second traffic priority level is higher than the first traffic priority level. In some aspects, the second set of traffic may include ultra reliable low latency communication traffic.

As indicated above, FIG. 8 is provided as an example. Other examples may differ from what was described with regard to FIG. 8. According to some examples, the first CU 810, the second CU 815, and/or another device may request a certain priority level from the network node 805. The network node 805 may provide a requested priority level such as, for example, if one or more conditions is met.

Figure 9:
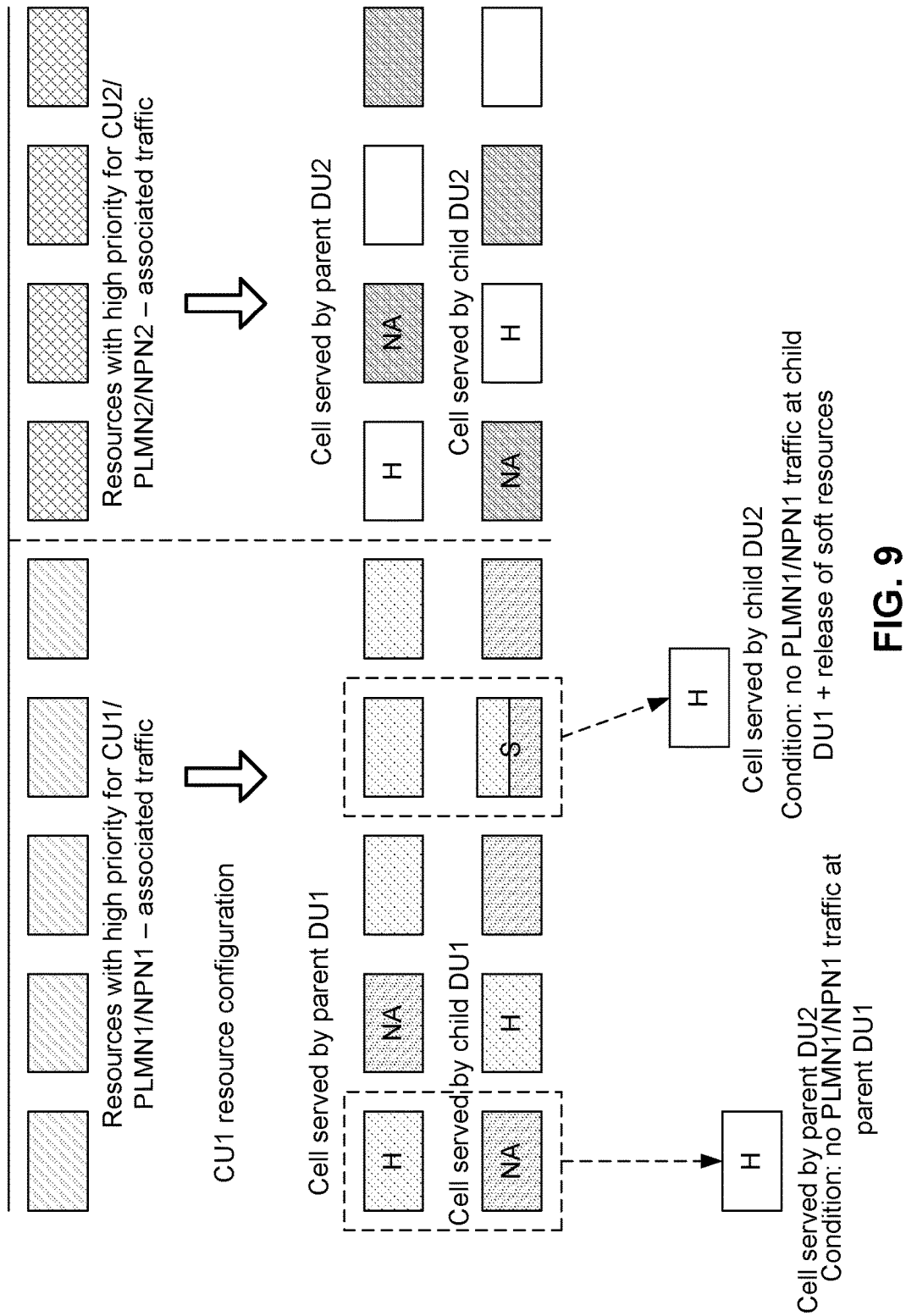
FIG. 9 is a diagram illustrating an example associated with priority-based resource planning in IAB RAN sharing, in accordance with the present disclosure.

FIG. 9 is a diagram illustrating an example 900 of using priority level associated with resource configuration for IAB RAN sharing, in accordance with the present disclosure. Aspects of example 900 may be implemented by a network node (e.g., network node 805 shown in FIG. 8), a first CU (e.g., the first CU 810 shown in FIG. 8), a second CU (e.g., the second CU 815 shown in FIG. 8), and/or the like.

As shown, a set of resources configured for high priority traffic for a first CU and/or network associated with a first CU (CU1/PLMN1/NPN1) may be configured, using a first resource configuration, to be used for a cell served by a first parent node DU1 and a first child node DU1. Similarly, a set of resources configured for high priority traffic for a second CU and/or network associated with a second CU (CU2/PLMN2/NPN2) may be configured, using a second resource configuration, to be used for a cell served by a second parent node DU2 and a second child node DU2. As shown, in a first example, a hard resource configured as high priority resource for CU1/PLMN1/NPN1 may be used by parent DU2 for CU2/PLMN2/NPN2-associated traffic if there is no CU1/PLMN1/NPN1-associated traffic. As shown, in a second example, a soft resource configured as high priority resource for CU1/PLMN1/NPN1 may be used by child DU2 for CU2/PLMN2/NPN2-associated traffic if there is no CU1/PLMN1/NPN1-associated traffic, and the resource is released by a parent node of child DU2.

Different variations may apply for use of a resource configured as high priority resource for CU1/PLMN1/NPN1 when there is no CU1/PLMN1/NPN1-associated traffic. In a first variation, the resource may be used to carry CU2/PLMN2/NPN2-associated traffic following the resource configuration of CU1. In a second variation, the resource may be used to carry CU2/PLMN2/NPN2-associated traffic following the resource configuration of CU2.

Any number of various scenarios may be implemented in conjunction with assigning priority levels to traffic and allowing use of unused resources from other resource configurations. As a result, some aspects may increase network reliability and efficiency, thereby positively impacting network performance.

As indicated above, FIG. 9 is provided as an example. Other examples may differ from what was described with regard to FIG. 9.

Figure 10:
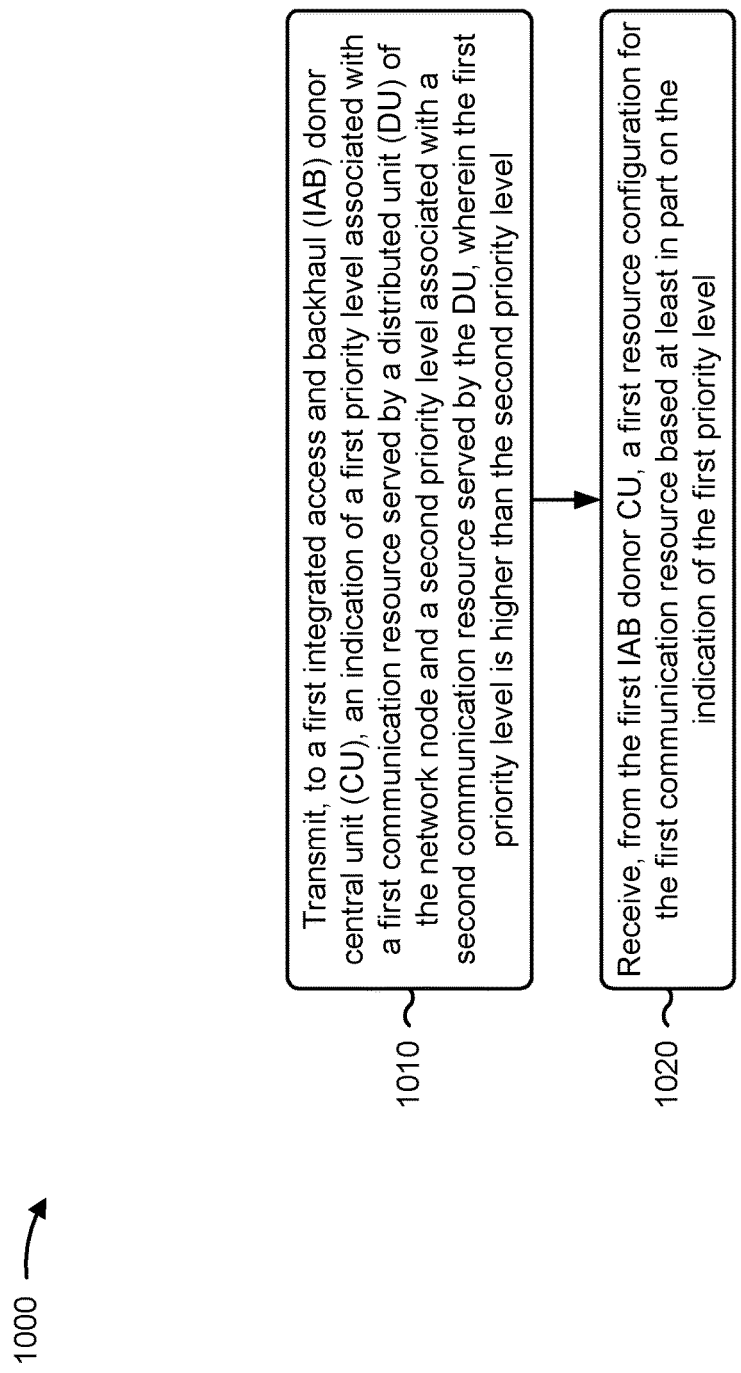
FIG. 10 is a diagram illustrating an example process associated with priority-based resource planning in IAB RAN sharing, in accordance with the present disclosure.

FIG. 10 is a diagram illustrating an example process 1000 performed, for example, by a network node, in accordance with the present disclosure. Example process 1000 is an example where the network node (e.g., network node 805 shown in FIG. 8) performs operations associated with priority-based resource planning in IAB RAN sharing.

As shown in FIG. 10, in some aspects, process 1000 may include transmitting, to a first IAB donor CU, an indication of a first priority level associated with a first communication resource served by a DU of the network node and a second priority level associated with a second communication resource served by the DU, wherein the first priority level is higher than the second priority level (block 1010). For example, the network node (e.g., using transmission component 1104, depicted in FIG. 11) may transmit, to a first IAB donor CU, an indication of a first priority level associated with a first communication resource served by a DU of the network node and a second priority level associated with a second communication resource served by the DU, wherein the first priority level is higher than the second priority level, as described above.

As further shown in FIG. 10, in some aspects, process 1000 may include receiving, from the first IAB donor CU, a first resource configuration for the first communication resource based at least in part on the indication of the first priority level (block 1020). For example, the network node (e.g., using reception component 1102, depicted in FIG. 1102) may receive, from the first IAB donor CU, a first resource configuration for the first communication resource based at least in part on the indication of the first priority level, as described above.

Process 1000 may include additional aspects, such as any single aspect or any combination of aspects described below and/or in connection with one or more other processes described elsewhere herein.

In a first aspect, process 1000 includes applying the first resource configuration in connection with the first communication resource.

In a second aspect, alone or in combination with the first aspect, the indication of the first priority level is transported via a signaling connection between the network node and the first IAB donor CU, and the signaling connection is associated with at least one of an F1 control protocol, or an RRC protocol.

In a third aspect, alone or in combination with one or more of the first and second aspects, at least one of the first communication resource or the second communication resource comprises a cell served by the network node, a frequency resource, a time resource, a spatial region, or a combination thereof.

In a fourth aspect, alone or in combination with one or more of the first through third aspects, the first resource configuration indicates an availability of the first communication resource.

In a fifth aspect, alone or in combination with one or more of the first through fourth aspects, the first resource configuration indicates a direction of the first communication resource.

In a sixth aspect, alone or in combination with one or more of the first through fifth aspects, the first resource configuration is specific to a child node served on the first communication resource.

In a seventh aspect, alone or in combination with one or more of the first through sixth aspects, process 1000 includes receiving, from the first IAB donor CU, a second resource configuration for the second communication resource.

In an eighth aspect, alone or in combination with one or more of the first through seventh aspects, process 1000 includes refraining from applying the second resource configuration in connection with the second communication resource.

In a ninth aspect, alone or in combination with one or more of the first through eighth aspects, process 1000 includes applying, based on a determination that a configuration condition is satisfied, the second resource configuration in connection with the second communication resource.

In a tenth aspect, alone or in combination with one or more of the first through ninth aspects, process 1000 includes establishing a signaling connection to a second IAB donor CU.

In an eleventh aspect, alone or in combination with one or more of the first through tenth aspects, the first IAB donor CU is associated with a first network and the second IAB donor CU is associated with a second network.

In a twelfth aspect, alone or in combination with one or more of the first through eleventh aspects, the first IAB donor CU is associated with resource management for a first IAB topology, and the second IAB donor CU is associated with resource management for a second IAB topology that overlaps the first IAB topology.

In a thirteenth aspect, alone or in combination with one or more of the first through twelfth aspects, process 1000 includes indicating, to the second IAB donor CU, at least one of the first communication resource or a third priority level associated with the first communication resource.

In a fourteenth aspect, alone or in combination with one or more of the first through thirteenth aspects, process 1000 includes transmitting, to the first IAB donor CU, an indication that the network node transmitted, to the second IAB donor CU, the indication of the at least one of the first communication resource or the third priority level associated with the first communication resource.

In a fifteenth aspect, alone or in combination with one or more of the first through fourteenth aspects, the third priority level is different than the first priority level.

In a sixteenth aspect, alone or in combination with one or more of the first through fifteenth aspects, process 1000 includes selecting at least one of the first priority level, the second priority level, or the third priority level based at least in part on an associated communication resource, a CU to which the associated resource is reported, a CU to which the at least one of the first priority level, the second priority level, or the third priority level is reported, a network identifier associated with a CU to which the associated resource is reported, a network identifier associated with a CU to which the at least one of the first priority level, the second priority level, or the third priority level is reported, or a combination thereof.

In a seventeenth aspect, alone or in combination with one or more of the first through sixteenth aspects, process 1000 includes receiving, from the second IAB donor CU, a third resource configuration for the first communication resource.

In an eighteenth aspect, alone or in combination with one or more of the first through seventeenth aspects, process 1000 includes determining that the first priority level is higher than the third priority level, and applying the first resource configuration based at least in part on determining that the first priority level is higher than the third priority level.

In a nineteenth aspect, alone or in combination with one or more of the first through eighteenth aspects, the first resource configuration indicates that the first communication resource is available, and the third resource configuration indicates that the first communication resource is not available.

In a twentieth aspect, alone or in combination with one or more of the first through nineteenth aspects, process 1000 includes using the first communication resource.

In a twenty-first aspect, alone or in combination with one or more of the first through twentieth aspects, the first resource configuration indicates that the first communication resource is conditionally available, and the third resource configuration indicates that the first communication resource is available.

In a twenty-second aspect, alone or in combination with one or more of the first through twenty-first aspects, process 1000 includes determining that a parent IAB node of the network node has released the first communication resource, and using the first communication resource based at least in part on determining that the parent IAB node of the network node has released the first communication resource.

In a twenty-third aspect, alone or in combination with one or more of the first through twenty-second aspects, the first resource configuration indicates that the first communication resource is available for uplink, and the third resource configuration indicates that the first communication resource is available for downlink.

In a twenty-fourth aspect, alone or in combination with one or more of the first through twenty-third aspects, process 1000 includes using the first communication resource for uplink.

In a twenty-fifth aspect, alone or in combination with one or more of the first through twenty-fourth aspects, process 1000 includes determining that the third priority level is higher than the first priority level, and applying the third resource configuration based at least in part on determining that the third priority level is higher than the first priority level.

In a twenty-sixth aspect, alone or in combination with one or more of the first through twenty-fifth aspects, process 1000 includes determining that the first priority level is higher than the third priority level, and using the first communication resource to communicate traffic corresponding to the first IAB donor CU or a network associated with the first IAB donor CU based at least in part on determining that the first priority level is higher than the third priority level.

In a twenty-seventh aspect, alone or in combination with one or more of the first through twenty-sixth aspects, using the first communication resource comprises scheduling a child node that is associated with the first IAB donor CU or that is associated with a network that is associated with the first IAB donor CU.

In a twenty-eighth aspect, alone or in combination with one or more of the first through twenty-seventh aspects, process 1000 includes determining that the third priority level is higher than the first priority level, and using the first communication resource to communicate traffic corresponding to the second IAB donor CU or a network associated with the second IAB donor CU based at least in part on determining that the third priority level is higher than the first priority level.

In a twenty-ninth aspect, alone or in combination with one or more of the first through twenty-eighth aspects, process 1000 includes determining that the first priority level is higher than the third priority level, determining that there is no traffic associated with the first communication resource and corresponding to the first IAB donor CU or a network associated with the first IAB donor CU, and applying the third resource configuration to the first communication resource based at least in part on determining that there is no traffic associated with the first communication resource.

In a thirtieth aspect, alone or in combination with one or more of the first through twenty-ninth aspects, process 1000 includes determining that the first priority level is higher than the third priority level, determining that there is no traffic associated with the first communication resource and corresponding to the first IAB donor CU or a network associated with the first IAB donor CU, and using the first communication resource to communicate traffic corresponding to the second IAB donor CU or a network associated with the second IAB donor CU based at least in part on determining that there is no traffic associated with the first communication resource.

In a thirty-first aspect, alone or in combination with one or more of the first through thirtieth aspects, a first set of traffic associated with the first IAB donor CU has a first associated traffic priority level, and a second set of traffic associated with the second IAB donor CU has a second associated traffic priority level, the method further comprising determining that the first priority level is higher than the third priority level, determining that the second traffic priority level is higher than the first traffic priority level, and using the first communication resource to communicate the second set of traffic based at least in part on determining that the second traffic priority level is higher than the first traffic priority level.

In a thirty-second aspect, alone or in combination with one or more of the first through thirty-first aspects, the second set of traffic comprises ultra reliable low latency communication traffic.

In a thirty-third aspect, alone or in combination with one or more of the first through thirty-second aspects, process 1000 includes receiving, from the first IAB donor CU, a request for additional communication resources having the first priority level.

In a thirty-fourth aspect, alone or in combination with one or more of the first through thirty-third aspects, process 1000 includes receiving, from the first IAB donor CU, a request for assignment of the first priority level to the second communication resource.

In a thirty-fifth aspect, alone or in combination with one or more of the first through thirty-fourth aspects, process 1000 includes determining that the first IAB donor CU releases the first communication resource of the first priority level.

In a thirty-sixth aspect, alone or in combination with one or more of the first through thirty-fifth aspects, process 1000 includes transmitting, to the first IAB donor CU, a request for the first IAB donor CU to release the first communication resource.

In a thirty-seventh aspect, alone or in combination with one or more of the first through thirty-sixth aspects, process 1000 includes transmitting, to the first IAB donor CU an indication that the first communication resource is released.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
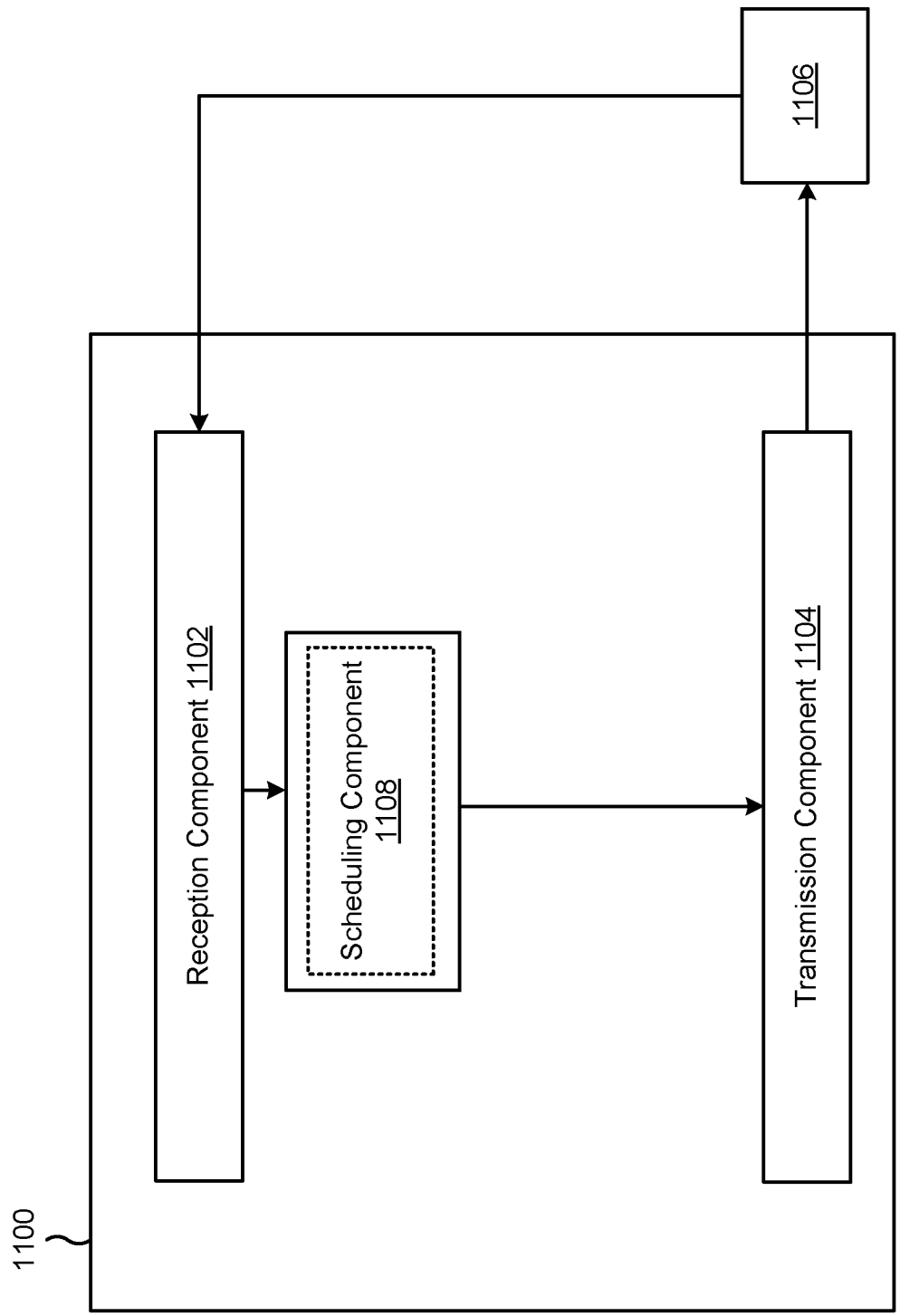
FIG. 11 is a block diagram of an example apparatus for wireless communication, in accordance with the present disclosure.

FIG. 11 is a block diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a scheduling component 1108, among other examples.

In some aspects, the apparatus 1100 may be configured to perform one or more operations described herein in connection with FIGS. 3-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the network node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the network node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the network node described above in connection with FIG. 2. In some aspects, the transmission component 1104 may be co-located with the reception component 1102 in a transceiver.

In some aspects, the scheduling component 1108, the transmission component 1104, and/or the reception component 1102 may communicate on the cell based at least in part on a cell resource configuration. In some aspects, the scheduling component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the scheduling component 1108 may be associated with a DU.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: transmitting, to a first integrated access and backhaul (IAB) donor central unit (CU), an indication of a first priority level associated with a first communication resource served by a distributed unit (DU) of the network node and a second priority level associated with a second communication resource served by the DU, wherein the first priority level is higher than the second priority level; and receiving, from the first IAB donor CU, a first resource configuration for the first communication resource based at least in part on the indication of the first priority level.

Aspect 2: The method of Aspect 1, further comprising applying the first resource configuration in connection with the first communication resource.

Aspect 3: The method of either of Aspects 1 or 2, wherein the indication of the first priority level is transported via a signaling connection between the network node and the first IAB donor CU, and wherein the signaling connection is associated with at least one of: an F1 control protocol, or a radio resource control protocol.

Aspect 4: The method of any of Aspects 1-3, wherein at least one of the first communication resource or the second communication resource comprises: a cell served by the network node, a frequency resource, a time resource, a spatial region, or a combination thereof.

Aspect 5: The method of any of Aspects 1-4, wherein the first resource configuration indicates an availability of the first communication resource.

Aspect 6: The method of any of Aspects 1-5, wherein the first resource configuration indicates a direction of the first communication resource.

Aspect 7: The method of any of Aspects 1-6, wherein the first resource configuration is specific to a child node served on the first communication resource.

Aspect 8: The method of any of Aspects 1-7, further comprising receiving, from the first IAB donor CU, a second resource configuration for the second communication resource.

Aspect 9: The method of Aspect 8, further comprising refraining from applying the second resource configuration in connection with the second communication resource.

Aspect 10: The method of Aspect 8, further comprising applying, based on a determination that a configuration condition is satisfied, the second resource configuration in connection with the second communication resource.

Aspect 11: The method of any of Aspects 1-12, further comprising establishing a signaling connection to a second IAB donor CU.

Aspect 12: The method of Aspect 11, wherein the first IAB donor CU is associated with a first network and the second IAB donor CU is associated with a second network.

Aspect 13: The method of Aspect 11, wherein the first IAB donor CU is associated with resource management for a first IAB topology, and wherein the second IAB donor CU is associated with resource management for a second IAB topology that overlaps the first IAB topology.

Aspect 14: The method of any of Aspects 11-13, further comprising indicating, to the second IAB donor CU, at least one of the first communication resource or a third priority level associated with the first communication resource.

Aspect 15: The method of Aspect 14, further comprising transmitting, to the first IAB donor CU, an indication that the network node transmitted, to the second IAB donor CU, the indication of the at least one of the first communication resource or the third priority level associated with the first communication resource.

Aspect 16: The method of either of Aspects 14 or 15, wherein the third priority level is different than the first priority level.

Aspect 17: The method of any of Aspects 14-16, further comprising selecting at least one of the first priority level, the second priority level, or the third priority level based at least in part on: an associated communication resource, a CU to which the associated resource is reported, a CU to which the at least one of the first priority level, the second priority level, or the third priority level is reported, a network identifier associated with a CU to which the associated resource is reported, a network identifier associated with a CU to which the at least one of the first priority level, the second priority level, or the third priority level is reported, or a combination thereof.

Aspect 18: The method of Aspect of any of Aspects 14-17, further comprising receiving, from the second IAB donor CU, a third resource configuration for the first communication resource.

Aspect 19: The method of Aspect 18, further comprising: determining that the first priority level is higher than the third priority level; and applying the first resource configuration based at least in part on determining that the first priority level is higher than the third priority level.

Aspect 20: The method of Aspect 19, wherein the first resource configuration indicates that the first communication resource is available, and wherein the third resource configuration indicates that the first communication resource is not available.

Aspect 21: The method of Aspect 20, further comprising using the first communication resource.

Aspect 22: The method of Aspect 19, wherein the first resource configuration indicates that the first communication resource is conditionally available, and wherein the third resource configuration indicates that the first communication resource is available.

Aspect 23: The method of Aspect 22, further comprising: determining that a parent IAB node of the network node has released the first communication resource; and using the first communication resource based at least in part on determining that the parent IAB node of the network node has released the first communication resource.

Aspect 24: The method of Aspect 19, wherein the first resource configuration indicates that the first communication resource is available for uplink, and wherein the third resource configuration indicates that the first communication resource is available for downlink.

Aspect 25: The method of Aspect 24, further comprising using the first communication resource for uplink.

Aspect 26: The method of Aspect 18, further comprising: determining that the third priority level is higher than the first priority level; and applying the third resource configuration based at least in part on determining that the third priority level is higher than the first priority level.

Aspect 27: The method of Aspect 18, further comprising: determining that the first priority level is higher than the third priority level; and using the first communication resource to communicate traffic corresponding to the first IAB donor CU or a network associated with the first IAB donor CU based at least in part on determining that the first priority level is higher than the third priority level.

Aspect 28: The method of Aspect 27, wherein using the first communication resource comprises scheduling a child node that is associated with the first IAB donor CU or that is associated with the network that is associated with the first IAB donor CU.

Aspect 29: The method of Aspect 18, further comprising: determining that the third priority level is higher than the first priority level; and using the first communication resource to communicate traffic corresponding to the second IAB donor CU or a network associated with the second IAB donor CU based at least in part on determining that the third priority level is higher than the first priority level.

Aspect 30: The method of Aspect 18, further comprising: determining that the first priority level is higher than the third priority level; determining that there is no traffic associated with the first communication resource and corresponding to the first IAB donor CU or a network associated with the first IAB donor CU; and applying the third resource configuration to the first communication resource based at least in part on determining that there is no traffic associated with the first communication resource.

Aspect 31: The method of Aspect 18, further comprising: determining that the first priority level is higher than the third priority level; determining that there is no traffic associated with the first communication resource and corresponding to the first IAB donor CU or a network associated with the first IAB donor CU; and using the first communication resource to communicate traffic corresponding to the second IAB donor CU or a network associated with the second IAB donor CU based at least in part on determining that there is no traffic associated with the first communication resource.

Aspect 32: The method of Aspect 18, wherein a first set of traffic associated with the first IAB donor CU has a first associated traffic priority level, and wherein a second set of traffic associated with the second IAB donor CU has a second associated traffic priority level, the method further comprising: determining that the first priority level is higher than the third priority level; determining that the second traffic priority level is higher than the first traffic priority level; and using the first communication resource to communicate the second set of traffic based at least in part on determining that the second traffic priority level is higher than the first traffic priority level.

Aspect 33: The method of Aspect 32, wherein the second set of traffic comprises ultra reliable low latency communication traffic.

Aspect 34: The method of any of Aspects 1-33, further comprising receiving, from the first IAB donor CU, a request for additional communication resources having the first priority level.

Aspect 35: The method of Aspect 34, further comprising receiving, from the first IAB donor CU, a request for assignment of the first priority level to the second communication resource.

Aspect 36: The method of any of Aspects 1-35, further comprising determining that the first IAB donor CU releases the first communication resource of the first priority level.

Aspect 37: The method of any of Aspects 1-36, further comprising transmitting, to the first IAB donor CU, a request for the first IAB donor CU to release the first communication resource.

Aspect 38: The method of any of Aspects 1-37, further comprising transmitting, to the first IAB donor CU an indication that the first communication resource is released.

Aspect 39: An apparatus for wireless communication at a device, comprising a processor; memory coupled with the processor; and instructions stored in the memory and executable by the processor to cause the apparatus to perform the method of one or more of Aspects 1-38.

Aspect 40: A device for wireless communication, comprising a memory and one or more processors coupled to the memory, the one or more processors configured to perform the method of one or more of Aspects 1-38.

Aspect 41: An apparatus for wireless communication, comprising at least one means for performing the method of one or more of Aspects 1-38.

Aspect 42: A non-transitory computer-readable medium storing code for wireless communication, the code comprising instructions executable by a processor to perform the method of one or more of Aspects 1-38.

Aspect 43: A non-transitory computer-readable medium storing a set of instructions for wireless communication, the set of instructions comprising one or more instructions that, when executed by one or more processors of a device, cause the device to perform the method of one or more of Aspects 1-38.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
one or more memories storing processor-readable code; and
one or more processors coupled with the one or more memories, the at least one of the one or more processors operable to cause the network node to:
transmit, to a first integrated access and backhaul (IAB) donor central unit (CU), an indication of a first priority level associated with a first communication resource served by a distributed unit (DU) of the network node and a second priority level associated with a second communication resource served by the DU, wherein the first priority level is higher than the second priority level;
establish a signaling connection to a second IAB donor CU, wherein the first IAB donor CU is associated with a first network, and the second IAB donor CU is associated with a second network; and
receive, from the first IAB donor CU, a first resource configuration for the first communication resource in accordance with the indication of the first priority level, wherein the first resource configuration is associated with the first network and the second network.

2. The network node of claim 1, wherein the at least one of the one or more processors are further configured to apply the first resource configuration in connection with the first communication resource.

3. The network node of claim 1, wherein at least one of the first communication resource or the second communication resource comprises:
a cell served by the network node,
a frequency resource,
a time resource,
a spatial region, or
a combination thereof.

4. The network node of claim 1, wherein the first resource configuration indicates an availability of the first communication resource.

5. The network node of claim 1, wherein the first resource configuration indicates a direction of the first communication resource.

6. The network node of claim 1, wherein the first resource configuration is specific to a child node served on the first communication resource.

7. The network node of claim 1, wherein the at least one of the one or more processors are further configured to receive, from the first IAB donor CU, a second resource configuration for the second communication resource.

8. The network node of claim 7, wherein the at least one of the one or more processors are further configured to refrain from applying the second resource configuration in connection with the second communication resource.

9. The network node of claim 7, wherein the at least one of the one or more processors are further configured to apply, based on a configuration condition being satisfied, the second resource configuration in connection with the second communication resource.

10. The network node of claim 1, wherein the first IAB donor CU is associated with resource management for a first IAB topology, and wherein the second IAB donor CU is associated with resource management for a second IAB topology that overlaps the first IAB topology.

11. The network node of claim 1, wherein the at least one of the one or more processors are further configured to indicate, to the second IAB donor CU, at least one of the first communication resource or a third priority level associated with the first communication resource.

12. The network node of claim 11, wherein the at least one of the one or more processors are further configured to transmit, to the first IAB donor CU, an indication that the network node transmitted, to the second IAB donor CU, the indication of the at least one of the first communication resource or the third priority level associated with the first communication resource.

13. The network node of claim 12, wherein the third priority level is different than the first priority level.

14. The network node of claim 12, wherein the at least one of the one or more processors are further configured to select at least one of the first priority level, the second priority level, or the third priority level in accordance with:
an associated communication resource,
a CU to which the associated resource is reported,
a CU to which the at least one of the first priority level, the second priority level, or the third priority level is reported,
a network identifier associated with a CU to which the associated resource is reported,
a network identifier associated with a CU to which the at least one of the first priority level, the second priority level, or the third priority level is reported, or
a combination thereof.

15. The network node of claim 12, wherein the at least one of the one or more processors are further configured to receive, from the second IAB donor CU, a third resource configuration for the first communication resource.

16. The network node of claim 15, wherein the at least one of the one or more processors are further configured to:
apply the first resource configuration in accordance with the first priority level being higher than the third priority level.

17. The network node of claim 15, wherein the first resource configuration indicates that the first communication resource is available, wherein the third resource configuration indicates that the first communication resource is not available, and wherein the at least one of the one or more processors are further configured to use the first communication resource.

18. The network node of claim 15, wherein the first resource configuration indicates that the first communication resource is conditionally available, and wherein the third resource configuration indicates that the first communication resource is available, and wherein the at least one of the one or more processors are further configured to:
use the first communication resource in accordance with a parent IAB node of the network node releasing the first communication resource.

19. The network node of claim 15, wherein the first resource configuration indicates that the first communication resource is available for uplink, and wherein the third resource configuration indicates that the first communication resource is available for downlink, wherein the at least one of the one or more processors are further configured to use the first communication resource for uplink.

20. The network node of claim 15, wherein the at least one of the one or more processors are further configured to:
use the first communication resource to communicate traffic corresponding to the first IAB donor CU or a network associated with the first IAB donor CU in accordance with the first priority level being higher than the third priority level.

21. The network node of claim 20, wherein the at least one of the one or more processors, to use the first communication resource, are configured to schedule a child node that is associated with the first IAB donor CU or that is associated with the network that is associated with the first IAB donor CU.

22. The network node of claim 15, wherein the at least one of the one or more processors are further configured to:
apply the third resource configuration to the first communication resource in accordance with the first priority level being higher than the third priority level and in accordance with an absence of traffic associated with the first communication resource.

23. The network node of claim 15, wherein the at least one of the one or more processors are further configured to:
use the first communication resource to communicate traffic corresponding to the second IAB donor CU or a network associated with the second IAB donor CU in accordance with the first priority level being higher than the third priority level and in accordance with an absence of traffic associated with the first communication resource.

24. The network node of claim 15, wherein a first set of traffic associated with the first IAB donor CU has a first associated traffic priority level, and wherein a second set of traffic associated with the second IAB donor CU has a second associated traffic priority level, wherein the at least one of the one or more processors are further configured to:
use the first communication resource to communicate the second set of traffic in accordance with the second traffic priority level being higher than the first traffic priority level, wherein the first priority level is higher than the third priority level.

25. The network node of claim 1, wherein the at least one of the one or more processors are further configured to receive, from the first IAB donor CU, a request for additional communication resources having the first priority level.

26. The network node of claim 25, wherein the at least one of the one or more processors are further configured to receive, from the first IAB donor CU, a request for assignment of the first priority level to the second communication resource.

27. The network node of claim 1, wherein the at least one of the one or more processors are further configured to transmit, to the first IAB donor CU, a request for the first IAB donor CU to release the first communication resource.

28. The network node of claim 1, wherein the first network comprises a first non-pubic network and the second network comprises a second non-public network.

29. The network node of claim 1, wherein the first network comprises a first public land mobile network and the second network comprises a second public land mobile network.

30. A method of wireless communication performed by a network node, comprising:
transmitting, to a first integrated access and backhaul (IAB) donor central unit (CU), an indication of a first priority level associated with a first communication resource served by a distributed unit (DU) of the network node and a second priority level associated with a second communication resource served by the DU, wherein the first priority level is higher than the second priority level;
establishing a signaling connection to a second IAB donor CU, wherein the first IAB donor CU is associated with a first network, and the second IAB donor CU is associated with a second network; and
receiving, from the first IAB donor CU, a first resource configuration for the first communication resource in accordance with the indication of the first priority level, wherein the first resource configuration is associated with the first network and the second network.

* * * * *